(12) United States Patent
Yoritsune et al.

(10) Patent No.: US 7,423,230 B2
(45) Date of Patent: Sep. 9, 2008

(54) ROTARY MANIPULATION ELECTRONIC DEVICE

(75) Inventors: Yasuhiro Yoritsune, Okayama (JP); Akira Matsumoto, Okayama (JP); Jun Sato, Okayama (JP); Takumi Nishimoto, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/650,462

(22) Filed: Jan. 8, 2007

(65) Prior Publication Data
US 2007/0163870 A1    Jul. 19, 2007

(30) Foreign Application Priority Data
Jan. 18, 2006    (JP) .............................. 2006-009549

(51) Int. Cl.
*H01H 19/11*    (2006.01)
(52) U.S. Cl. ..................... 200/565; 200/570; 200/336

(58) Field of Classification Search ............... 200/565, 200/564, 570, 571, 336
See application file for complete search history.

(56) References Cited

U.S. PATENT DOCUMENTS

| 4,146,758 A | * | 3/1979 | Hiwatahi et al. | ............ 200/565 |
| 4,455,458 A | * | 6/1984 | Oyama | ................... 200/565 |
| 4,855,541 A | * | 8/1989 | Yamashita et al. | ......... 200/565 |

FOREIGN PATENT DOCUMENTS

JP    10-199371    7/1998

* cited by examiner

*Primary Examiner*—Renee S Luebke
(74) *Attorney, Agent, or Firm*—Wenderoth, Lind & Ponack, L.L.P.

(57) ABSTRACT

A rotary manipulation type electronic device permits users to obtain a feel of manipulation during rotational manipulations and produces clicking sounds of manipulations to thereby obtain an audiological sense of manipulations. The rotary manipulation type electronic device has a base body with which a rotary body is rotatably combined. An operative element is disposed such that movement of the operative element is restricted by an inside wall of a terminal leading portion of the base body and by leg portions of a leaf spring. Engagement portions engaging an uneven portion of a top surface of a flange portion of the rotary body protrude from the operative element. The leaf spring is brought into elastic contact with the top surface of the operative element.

12 Claims, 9 Drawing Sheets

ROTARY MANIPULATION ELECTRONIC DEVICE

FIELD OF THE INVENTION

The present invention relates to a rotary manipulation electronic device such as a rotationally manipulated volume control or encoder used to adjust the volume, sound quality, image quality, or the like of an AV device. The device may also be used for temperature control of an in-vehicle air conditioning system.

BACKGROUND OF THE INVENTION

In recent years, there has been a demand for rotationally manipulated volume controls and encoders which are mounted in AV devices and in-vehicle air-conditioning systems and which produce clicking sounds at a time of manipulation together with feeling of manipulation transmitted to the hand when they are rotationally manipulated.

Conventional, rotary manipulation type electronic devices are now described taking a rotationally manipulated encoder as an example by referring to the drawings.

FIG. 12 is a cross-sectional view of a conventional, rotationally manipulated encoder. FIG. 13 is an exploded perspective view of the conventional, rotationally manipulated encoder. In these figures, base body 1 has a central cylindrically shaped portion forming hollow portion 1A and is substantially annular. The upper side of portion 1A is open. Three fixed contacts 2 consisting of a common contact and two contacts for signals are disposed on the bottom surface of the opening portion. These fixed contacts 2 are arranged on the same circumference and insulated from each other by 120° intervals. Contact terminal 3A for a signal, contact terminal 3B for a signal, and common contact terminal 3C are electrically connected with three fixed contacts 2, respectively. These terminals extend outwardly as one row from terminal leading portion 1C protruding from the side wall of base body 1. These terminals 3A, 3B, and 3C constitute terminal portion 3.

Rotary body 5 has cylindrical portion 5B and flange portion 5C located below cylindrical portion 5B where central hole 5A is formed. Uneven portion 5D is formed on an entire top surface of flange portion 5C. Sliding contact 4 is fixed to the bottom surface of flange portion 5C. Sliding contact 4 has contact portions 4A at three locations which are circumferentially equally spaced from each other by 120° to produce ON/OFF signals by making sliding motion on three fixed contacts 2. In rotary body 5, the inner surface of cylindrical portion 5B is in contact with outer surface of inner wall 1B forming hollow portion 1A of base body 1. The rotary body 5 is fitted with base body 1 rotatably.

Cover plate 6 covers the opening portion of base body 1. Upper portions of cylindrical portion 5B of rotary body 5 and of wall 1B of base body 1 protrude from center hole 6A. The cover plate is made of a metal plate and crimped around base body 1. Annular leaf spring 7 is mounted to the bottom surface of cover plate 6.

This leaf spring 7 has horizontal portions whose both ends are bent obliquely downwardly as viewed from a side. Downwardly protruding protrusive portions 7A are formed in opposite positions which are bent as described above. Two protrusive portions 7A are in elastic contact with uneven portion 5D formed on the top surface of flange portion 5C of the above-described rotary body 5. Cover plate 6 is crimped to base body 1.

In the structure described so far, if cylindrical portion 5B of rotary body 5 protruding upwardly from center hole 6A in cover plate 6 is rotationally manipulated, contact portions 4A of sliding contact 4 on the bottom surface of flange portion 5C slide on fixed contacts 2 that are formed on the bottom surface of the opening portion of base body 1. A train of ON/OFF signals is produced between terminals 3A and 3C electrically connected with fixed contacts 2. A second train of ON/OFF signals is produced between terminals 3B and 3C. Processing corresponding to the direction of rotation is performed in a signal processing circuit in the installed device by the two trains of ON/OFF signals. For example, a function of increasing or reducing the volume is activated.

Because of the rotation of this rotary body 5, protrusive portions 7A at the two locations of leaf spring 7 fixed to the bottom surface of cover plate 6 make sliding motion while making elastic contact with uneven portion 5D formed on the top surface of flange portion 5C of rotary body 5. Consequently, a feeling of clicking (feeling of moderateness) corresponding to the position of uneven portion 5D is produced.

For example, Japanese Patent Unexamined Publication No. 1998-199371 is known as prior art documentary information associated with the invention.

However, in the above-described conventional, rotationally manipulated encoder (rotary manipulation type electronic device), a sound of manipulation produced as a result of rotational manipulation of rotary body 5 is only a low-pitched, dull sound. Therefore, there is the problem that it is difficult to produce clicking sound of manipulation, which is a demand from the market.

SUMMARY OF THE INVENTION

A rotary manipulation type electronic device comprises: a base body having an opening portion in which a functional part is provided, the functional part generates an electric signal by contact with a sliding contact; a rotary body having a sliding contact on its bottom surface and an uneven portion on its upper surface, the rotary body being rotatably supported by the base body; a leaf spring making elastic contact with the uneven portion; and a cover plate having the leaf spring on its bottom surface, the cover plate providing a cover over the opening portion of the base body. The rotary manipulation electronic device further comprises an operative element having an engagement portion that makes engagement with the uneven portion. Motion of the operative element in the direction of rotation of the rotary body and in the outward direction going away from the center of rotation is restricted. The operative element is pushed toward the uneven portion by the leaf spring.

DETAILED DESCRIPTION OF THE INVENTION

The present invention is intended to solve the aforementioned problems with the prior art, and provides a rotary manipulation type electronic device which permits users to obtain a feeling of manipulations when the part is rotationally manipulated and produces clicking sounds of manipulations, thus permitting the users to obtain audiological feeling of manipulations, too.

The present invention is hereinafter described with reference to FIGS. 1 to 11.

Figure 12:
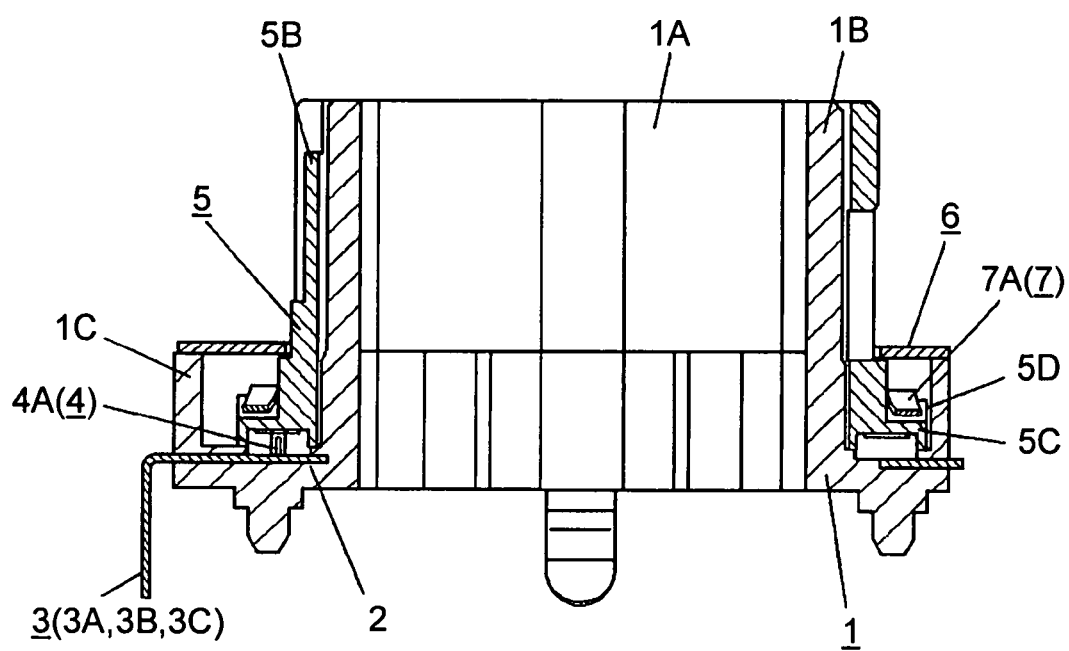
FIG. 12 is a cross-sectional view of a conventional, rotationally manipulated encoder.
Figure 13:
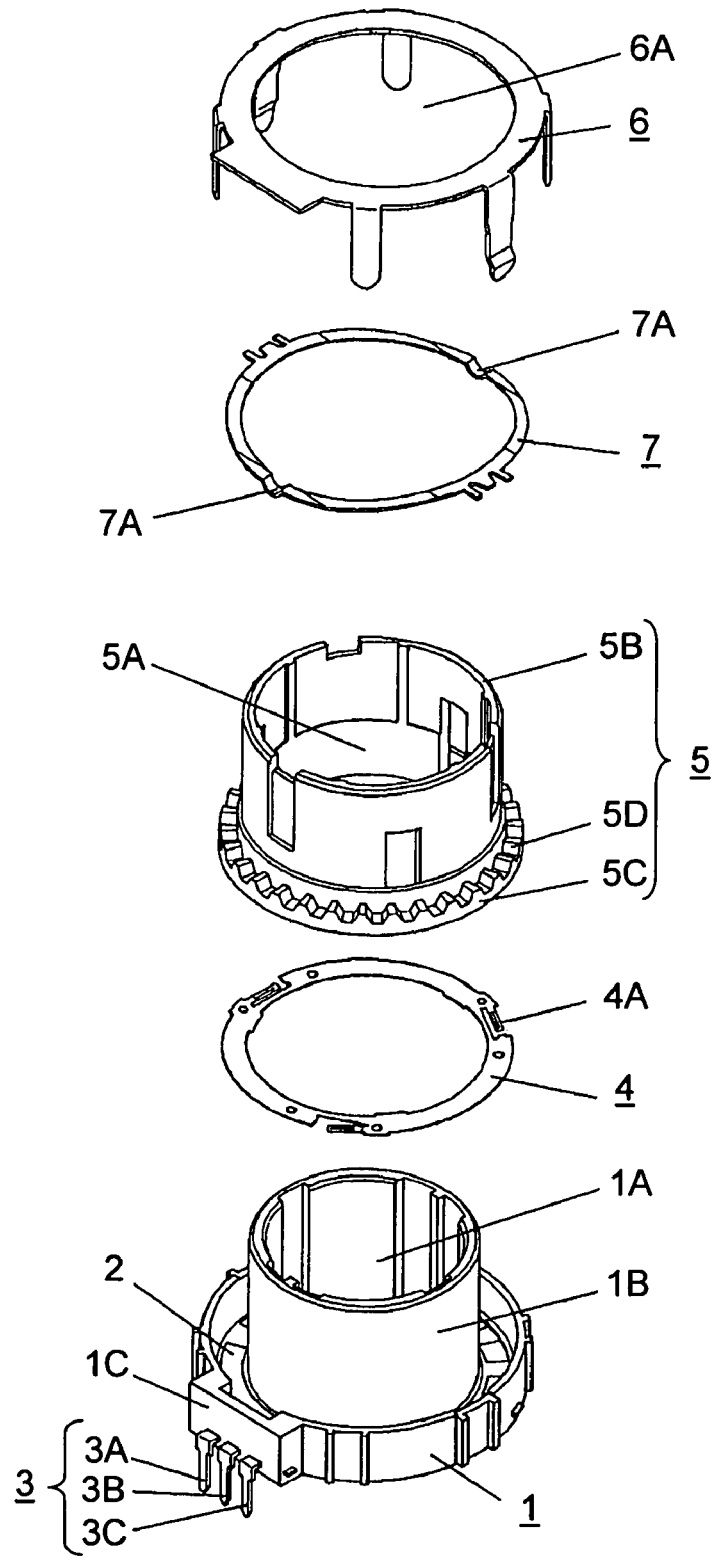
FIG. 13 is an exploded perspective view of the conventional, rotationally manipulated encoder.

A rotationally manipulated encoder is described as one example of rotary manipulation type electronic device according to the present invention. However, the rotary manipulation type electronic device of the present invention is not limited to a rotationally manipulated encoder. Furthermore, those parts which are identical in configuration with FIGS. 12 and 13 are denoted by the same symbols and their detailed description is omitted.

EMBODIMENT 1

Figure 1:
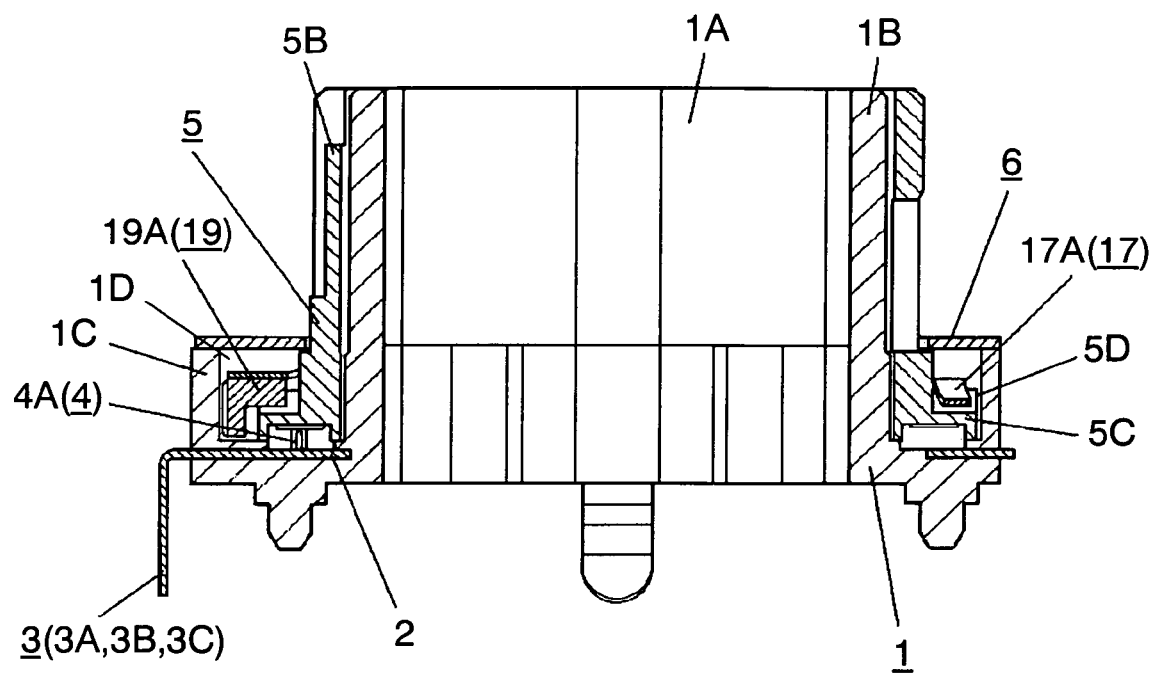
FIG. 1 is a cross-sectional view of a rotationally manipulated encoder according to a first embodiment of the present invention.
Figure 2:
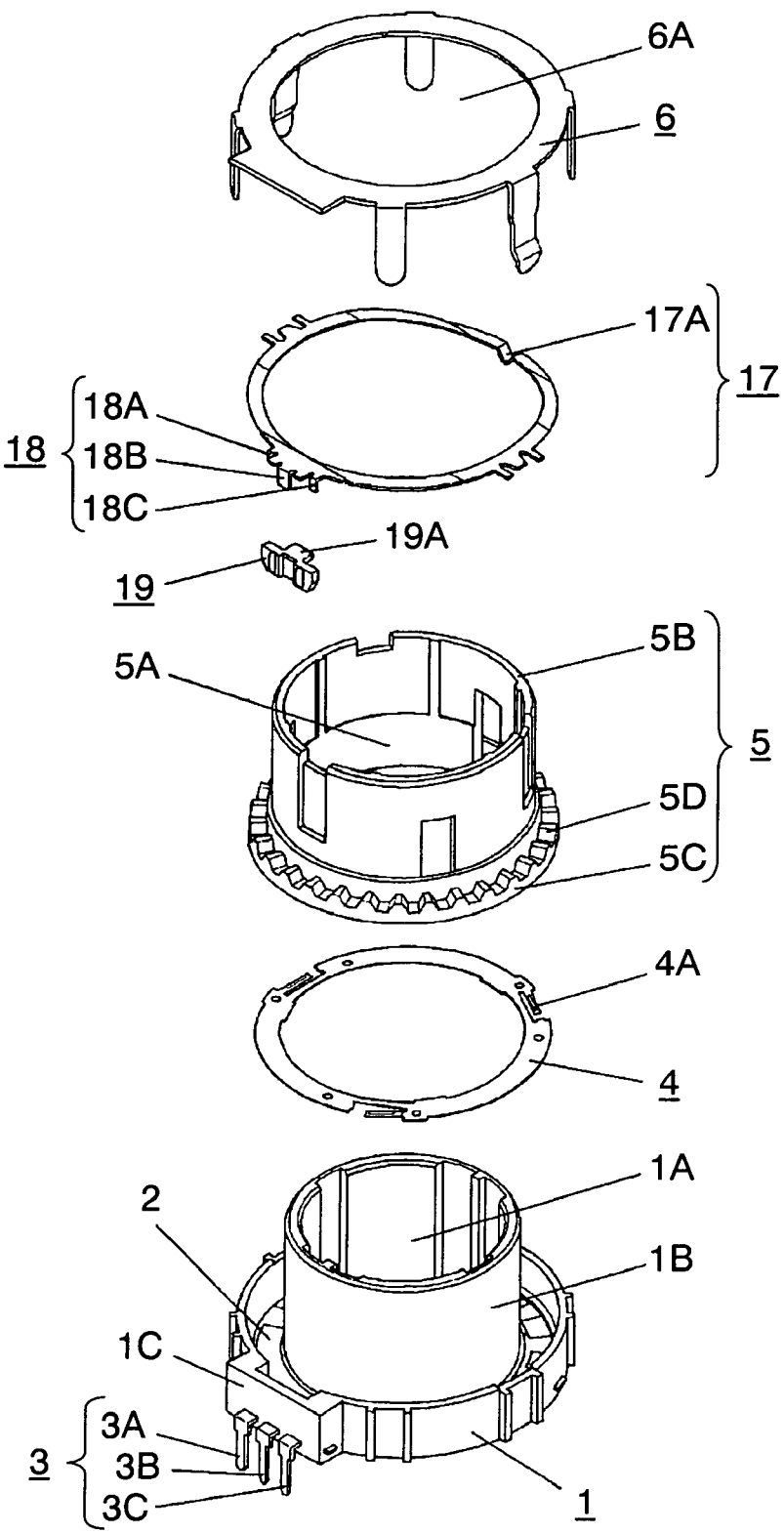
FIG. 2 is an exploded perspective view of the rotationally manipulated encoder according to the first embodiment of the invention.
Figure 3:
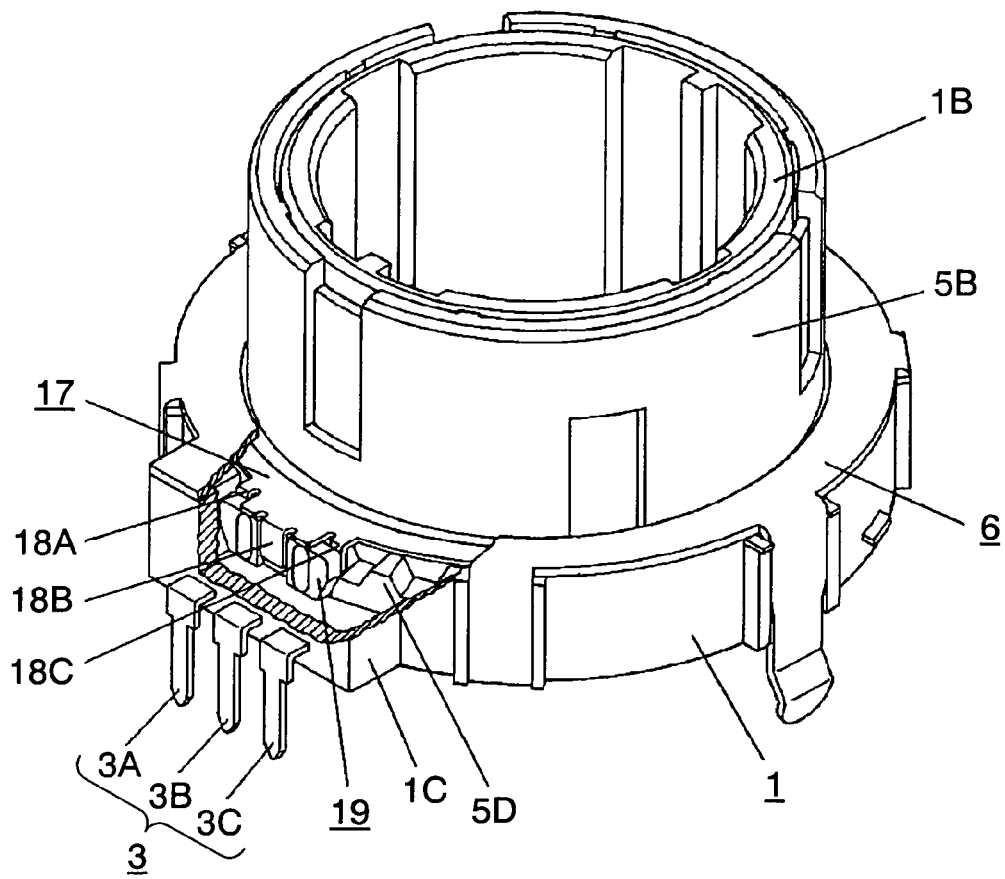
FIG. 3 is a cutaway perspective view of main portions of the rotationally manipulated encoder according to the first embodiment of the invention.
Figure 4:
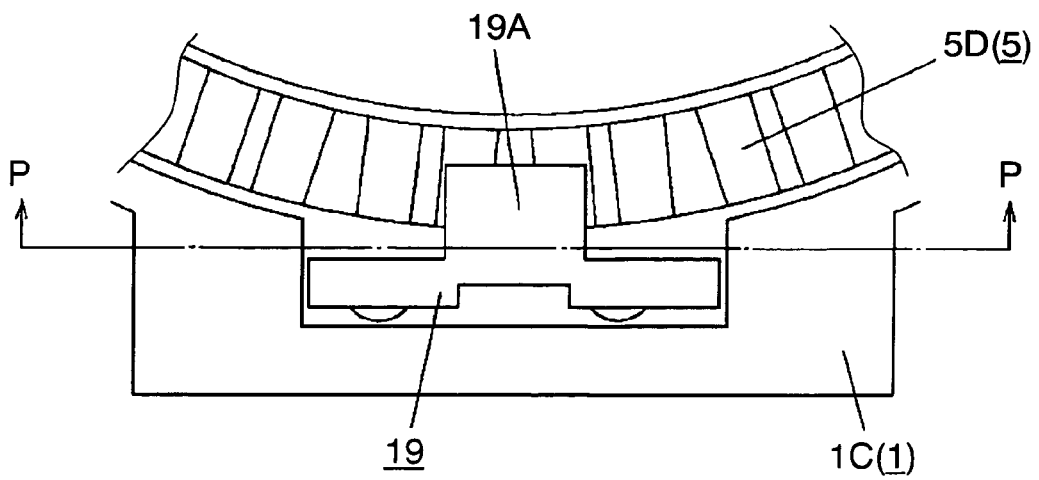
FIG. 4 is a plan view of the main portions of the rotationally manipulated encoder according to the first embodiment of the invention, showing the state in which the cover plate and leaf spring have been removed.

FIG. 1 is a cross-sectional view of a rotationally manipulated encoder according to a first embodiment of the present invention. FIG. 2 is an exploded perspective view of a rotationally manipulated encoder according to the first embodiment of the invention. FIG. 3 is a cutaway perspective view of main portions of the rotationally manipulated encoder according to the first embodiment of the invention. FIG. 4 is a plan view of main portions of the rotationally manipulated encoder according to the first embodiment of the invention, showing the state in which the cover plate and leaf spring have been removed. FIGS. 5-8 are cross-sectional views of FIG. 4, and are views for illustrating the operation.

In these figures, substantially annular base body 1 has a hollow portion 1A in the center and is open on the upper side. Three fixed contacts 2 are arranged on the bottom surface of the opening portion 1D of base body 1 and are disposed on the same circumference such that they divide the circumference into three portions. Terminal 3A, terminal 3B, and terminal 3C are electrically connected with these fixed contacts 2 are disposed in a row and extend outwardly from terminal readout portion 1C protruding from the side wall of base body 1. These terminals 3A, 3B, and 3C constitute terminal portion 3.

Terminal portion 3 is one example of a functional part which transmits an electrical signal by contact with a sliding contact.

The inner wall of cylindrical portion 5B forms a central hole 5A in rotary body 5 and is fitted over the outer periphery of inner peripheral wall 1B forming hollow portion 1A of base body 1. Thus, rotary body 5 is combined with the base body 1 rotatably. Substantially wavy uneven portion 5D which is uniformly arranged over the whole periphery of the top surface is formed on flange portion 5C located below rotary body 5. Sliding contact 4 which has three contact portions 4A, on its bottom surface, and slides on fixed contacts 2 is fixedly held to flange portion 5C.

Cover plate 6 made of a metal plate covers the opening portion 1D of base body 1 (shown in FIG. 1), and upper portions of cylindrical portion 5B of rotary body 5 and wall 1B of base body 1 protrude upward from center hole 6A. The cover plate is crimped around base body 1. An annular leaf spring 17 is mounted to the bottom surface of cover plate 6.

Annular leaf spring 17 has protrusive portion 17A. Leaf spring 17 has a central portion that is made of a flat plate portion as viewed from a side. Both sides are bent from end portions of the flat plate portion obliquely downwardly, and protrusive portion 17A is located on the opposite side of terminal leading portion 1C of base body 1, and protrudes downward. This protrusive portion 17A is in elastic contact with uneven portion 5D formed on the top surface of flange portion 5C of rotary body 5. The cover plate 6 is crimped and held to base body 1.

Since protrusive portion 17A is in elastic contact with uneven portion 5D, a feeling of clicking is obtained when protrusive portion 17A slides over uneven portion 5D according to rotational manipulation of rotary body 5.

In the first embodiment, as shown in FIG. 3, a front end portion located on the other side of protrusive portion 17A of leaf spring 17, is also bent. The front end portion bent in this way is in elastic contact with an upper portion of operative element 19 die cast from zinc. Operative element 19 is disposed inside of terminal leading portion 1C protruding from a side wall of base body 1. Thus, the front end portion pushes operative element 19 downward. Leg portions 18 bent downward are formed to restrict the position of operative element 19. Three leg portions 18 are made up of leg 18A, leg 18B, and leg 18C.

In this annular leaf spring 17, the position at which protrusive portion 17A is formed and the position at which operative element 19 is brought into elastic contact are located opposite to each other. Thus, the load at which protrusive portion 17A makes elastic contact with uneven portion 5D and the load at which operative element 19 is brought into elastic contact are applied with good balance on the opposite sides of the flat plate portion in the central portion. Therefore, stable spring load can be maintained for a long time.

The positions at which legs 18A and 18C are equidistant from the center of rotation of rotary body 5 and are not in contact with the outer periphery of flange portion 5C of rotary body 5. The position at which central leg 18B is bent is located more radially outwardly of rotary body 5 than legs 18A and 18C. The spacing between central leg 18B and each of legs 18A and 18C at both ends is set slightly greater than the width of operative element 19. Operative element 19 is located between central leg 18B and legs 18A and 18C at both ends. The position of operative element 19 is restricted by two legs 18A and 18C and by central leg 18B such that the distance from the center of rotation of rotary body 5 does not deviate greatly.

The operative element 19, has a semi-cylindrical engagement portion 19A that engages uneven portion 5D of rotary body 5 and protrudes toward the center of rotation of rotary body 5. Since the top surface of operative element 19 receives downward spring pressure from leaf spring 17, the arc-shaped portion of the bottom surface of engagement portion 19A is in elastic contact with uneven portion 5D of flange portion 5C.

The operative element 19, has a semi-cylindrical engagement portion 19A that engages uneven portion 5D of rotary body 5 and protrudes, as a cantilever, toward the center of rotation of rotary body 5. Since the top surface of operative element 19 receives downward spring pressure from leaf spring 17, the arc-shaped portion of the bottom surface of engagement portion 19A is in elastic contact with uneven portion 5D of flange portion 5C.

In the rotationally manipulated encoder constructed as described so far, if cylindrical portion 5B of rotary body 5 is rotationally manipulated, rotary body 5 rotates. Contact portion 4A of sliding contact 4 on the bottom surface of flange portion 5C of rotary body 5 slides on fixed contacts 2. ON/OFF signals are produced between terminals 3A and 3C and between terminals 3B and 3C. A given function corresponding to the direction of rotation is operated under control of the signal processing circuit of the installed device and control portion based on the two trains of ON/OFF signals.

Because of the rotation of this rotary body 5, protrusive portion 17A of leaf spring 17 mounted to the bottom surface of cover plate 6 slides while in elastic contact with uneven portion 5D formed on the top surface of flange portion 5C of rotary body 5 and so a feeling of clicking corresponding to the position of uneven portion 5D is produced.

In the first embodiment, an end portion of leaf spring 17 located on the side of terminal leading portion 1C of base body 1 pushes the operative element 19 downward. The end portion is located on the opposite side of protrusive portion 17A of leaf spring 17 and produces a feeling of clicking, and pushes and urges operative element 19 downward with a spring pressure. The position of operative element 19 is restricted by leg portions 18. Therefore, during rotation of rotary body 5, engagement portion 19A of operative element 19 also slides while in elastic contact with uneven portion 5D of rotary body 5.

Figure 5:
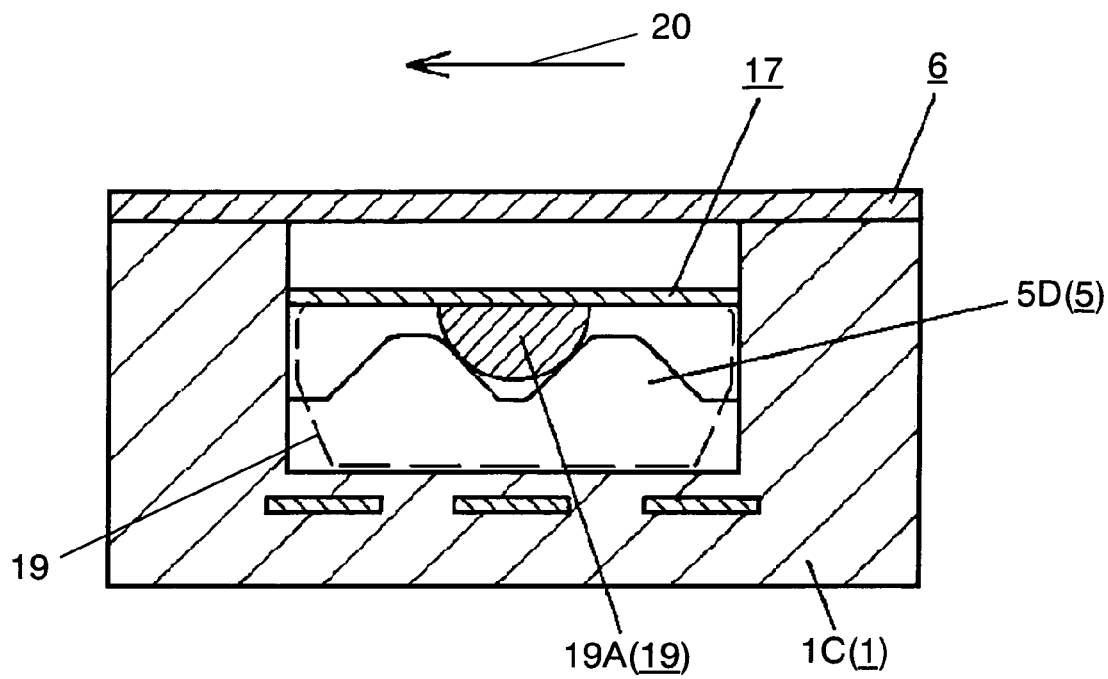
FIG. 5 is a cross-sectional view of FIG. 4, for illustrating the operation.
Figure 6:
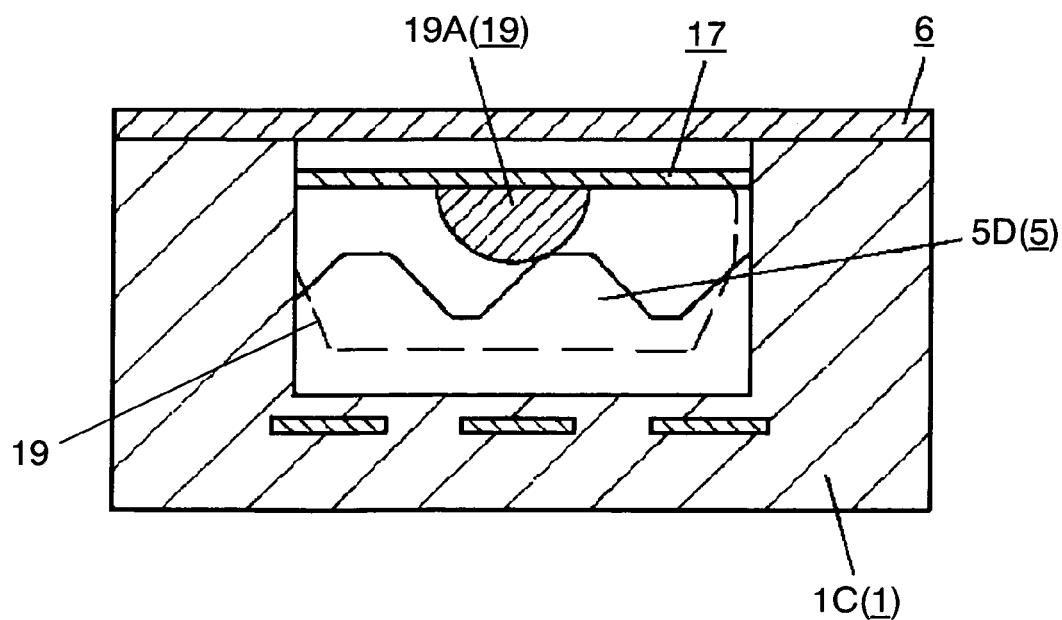
FIG. 6 is a cross-sectional view of FIG. 4, for illustrating the operation.
Figure 7:
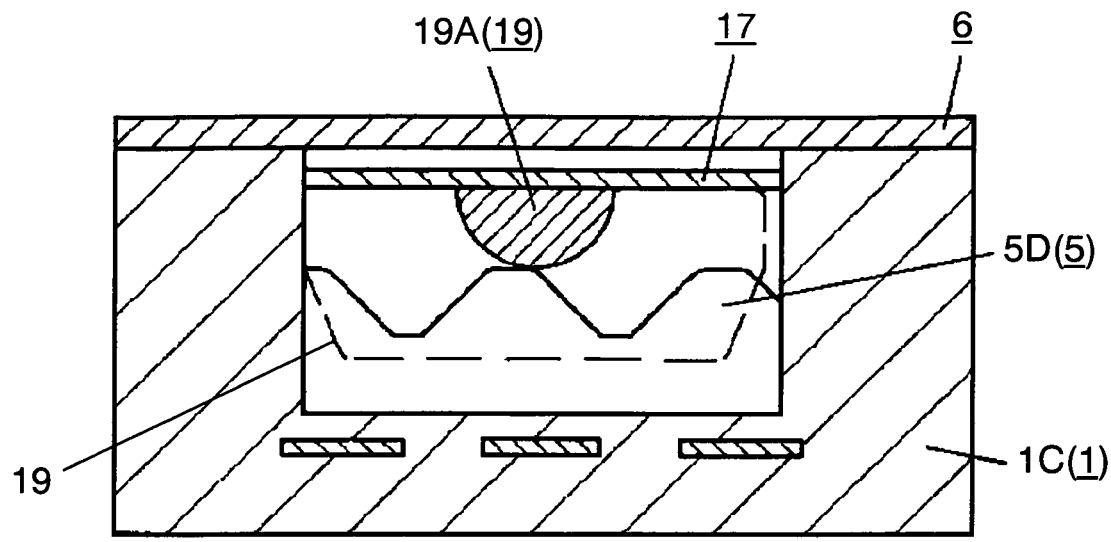
FIG. 7 is a cross-sectional view of FIG. 4, for illustrating the operation.
Figure 8:
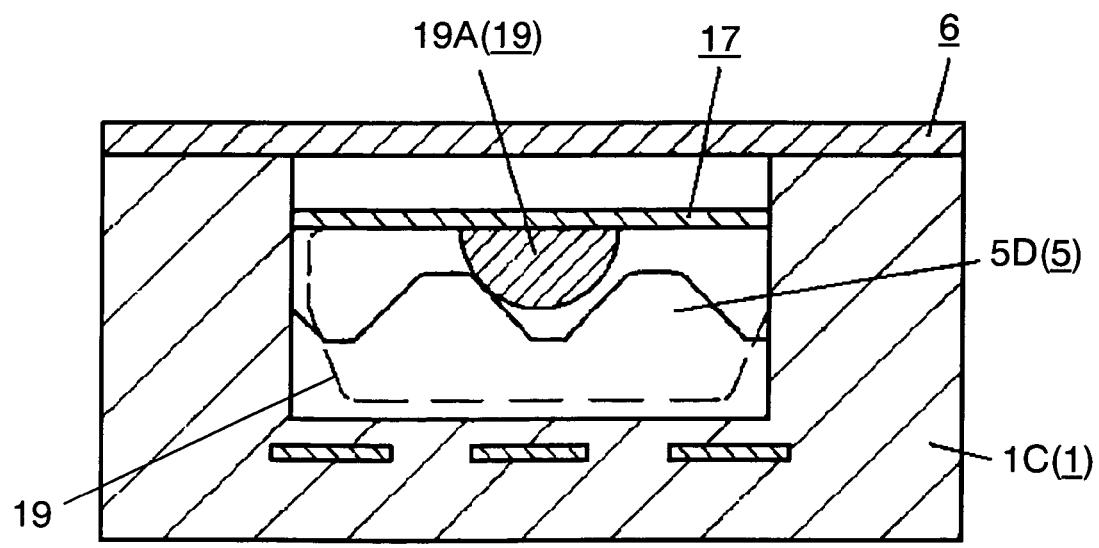
FIG. 8 is a cross-sectional view of FIG. 4, for illustrating the operation.

The operation of this operative element 19 is described further. FIGS. 5-8 are cross-sectional views on sectional line P-P of FIG. 4. First, as shown in FIGS. 5 to 8, it is assumed that engagement portion 19A of operative element 19 (shown by a broken line) which is in a stable state in a concave portion of uneven portion 5D rotates rotary body 5 in the direction of arrow 20 as shown in FIG. 5. As shown in FIG. 6, as rotary body 5 rotates, operative element 19 is pushed in the direction of rotation and moves into the position where the side surface of operative element 19 comes into contact with the inside wall of terminal leading portion 1C. At the same time, engagement portion 19A of operative element 19 incrementally moves upward on the tilted surface of uneven portion 5D against the spring pressure of leaf spring 17. After engagement portion 19A has reached the top portion of the convex portion of uneven portion 5D, engagement portion 19A passes the top portion of the convex portion as shown in FIG. 7 and rushes down the inclined surface going toward a concave portion of uneven portion 5D by the spring pressure of leaf spring 17. Then, as shown in FIG. 8, the opposite side surface of operative element 19 collides against the corresponding inside wall of terminal leading portion 1C, producing small sound of collision.

The above-described operation of this operative element 19 is performed repeatedly and consecutively according to rotational manipulations. This produces a series of small sounds of collisions. These sounds of collisions create clicking sounds of manipulations during rotational manipulations. Consequently, an audiological sensation of manipulations is obtained.

If rotary body 5 is rotationally manipulated in the direction opposite to arrow 20, operative element 19 operates similarly to the foregoing but in the reverse direction, producing sounds of collisions.

A dimensional relationship may be so set that engagement portion 19A collides against the next inclined surface of uneven portion 5D to produce sound before the side surface of operative element 19 collides against the inside wall of terminal leading portion 1C. A choice may be made according to a favorite sound of collision.

Furthermore, the sound of collision can be varied also by modifying the shapes of the colliding portion of the side surface of operative element 19 and colliding portion of the inside wall of terminal leading portion 1C, or by changing the material of operative element 19 to a synthetic resin or the like. Therefore, a favorite sound of manipulation can be obtained by making an appropriate choice.

In this way, according to the first embodiment, a rotationally manipulated encoder (rotary manipulation type electronic device) can be realized which produces clicking sounds of manipulations as rotary body 5 is rotationally manipulated, and permits users to obtain an audiological sensation of manipulations.

A feeling of clicking felt by rotationally manipulating rotary body 5 is synchronized with clicking sound by adjusting the position of protrusive portion 17A such that protrusive portion 17A of leaf spring 17 is located in a concave portion of uneven portion 5D while engagement portion 19A of operative element 19 is located in the concave portion of uneven portion 5D. A rotationally manipulated encoder (rotary manipulation type electronic device) can be accomplished which permits users to hear clicking sounds of manipulations synchronized with the feeling of clicking.

EMBODIMENT 2

The second embodiment of the present invention is hereinafter described with reference to FIGS. 9 to 11. Those parts which are identical in configuration with their counterparts of the first embodiment are denoted by the same numerals and their detailed description is omitted.

Figure 9:
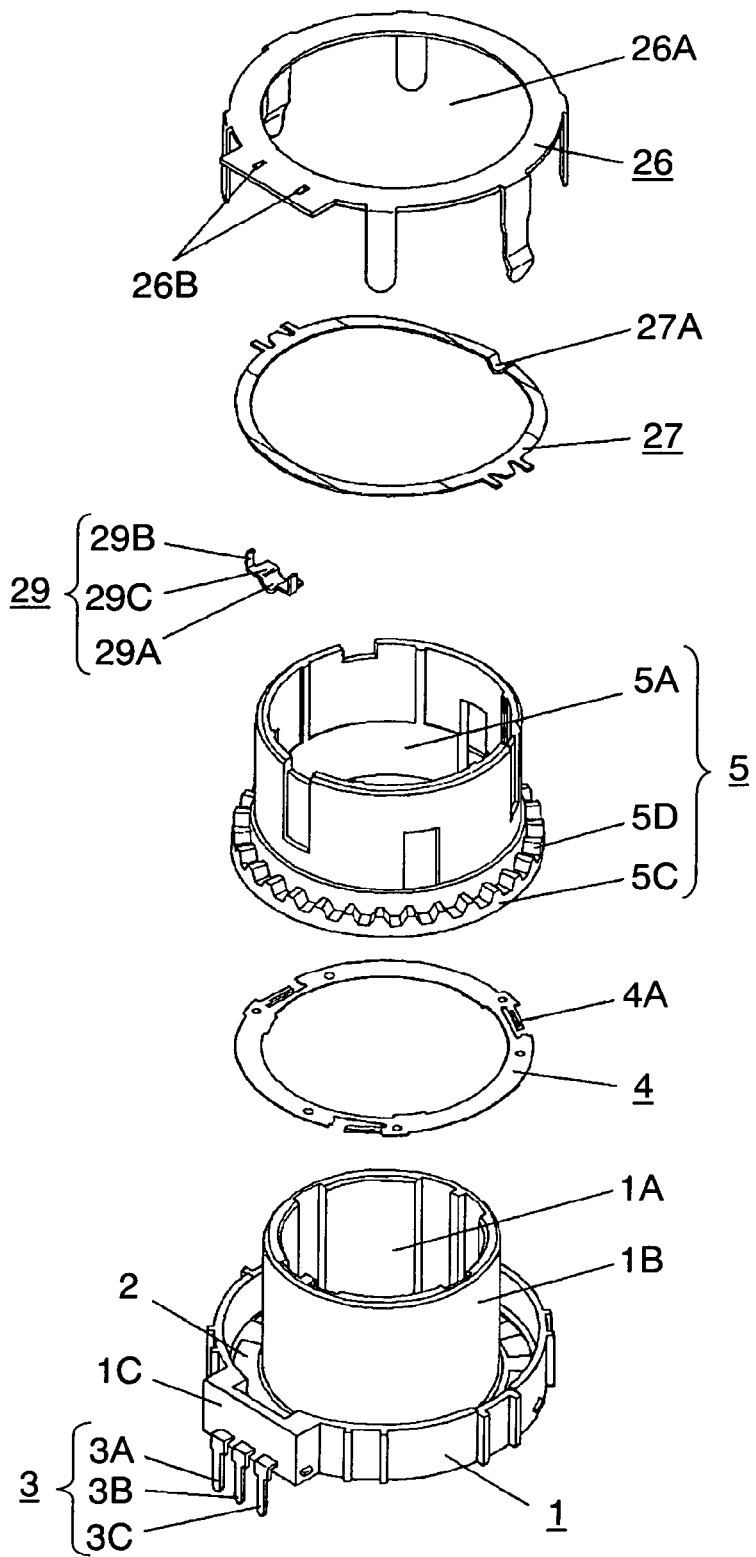
FIG. 9 is an exploded perspective view of a rotationally manipulated encoder according to a second embodiment of the invention.

FIG. 9 is an exploded perspective view of a rotationally manipulated encoder according to a second embodiment of the present invention. FIG. 10 is a cutaway perspective view of main portions of the rotationally manipulated encoder according to the second embodiment of the invention. FIG. 11 is a cross-sectional view of main portions of the rotationally manipulated encoder according to the second embodiment of the invention. In these figures, base body 1 has a hollow portion 1A. Fixed contacts 2 are arranged on the bottom portion of an opening. Terminal portions 3 electrically connected to the fixed contacts 2, extend out from the base body 1. Central hole 5A of rotary body 5 is fitted over the outer periphery of inner peripheral wall 1B forming hollow portion 1A and thus rotary body 5 is combined with the based body 1 rotatably. Uneven portion 5D is formed on the top surface of the outer periphery of flange portion 5C of rotary body 5. Sliding contact 4 sliding on fixed contact 2 is disposed on the bottom surface of flange portion 5C of the uneven portion 5D. Cover plate 26 permits inner peripheral wall 1B of base body 1 and cylindrical portion 5B of rotary body 5 to protrude from center hole 26A. The cover plate 26 is mounted so as to cover the top surface of the opening 1D in base body 1. An annular leaf spring 27 having protrusive portion 27A makes elastic and sliding contact with uneven portion 5D and is mounted to the bottom surface of cover body 26. These are similar to those according to the first embodiment.

Figure 10:
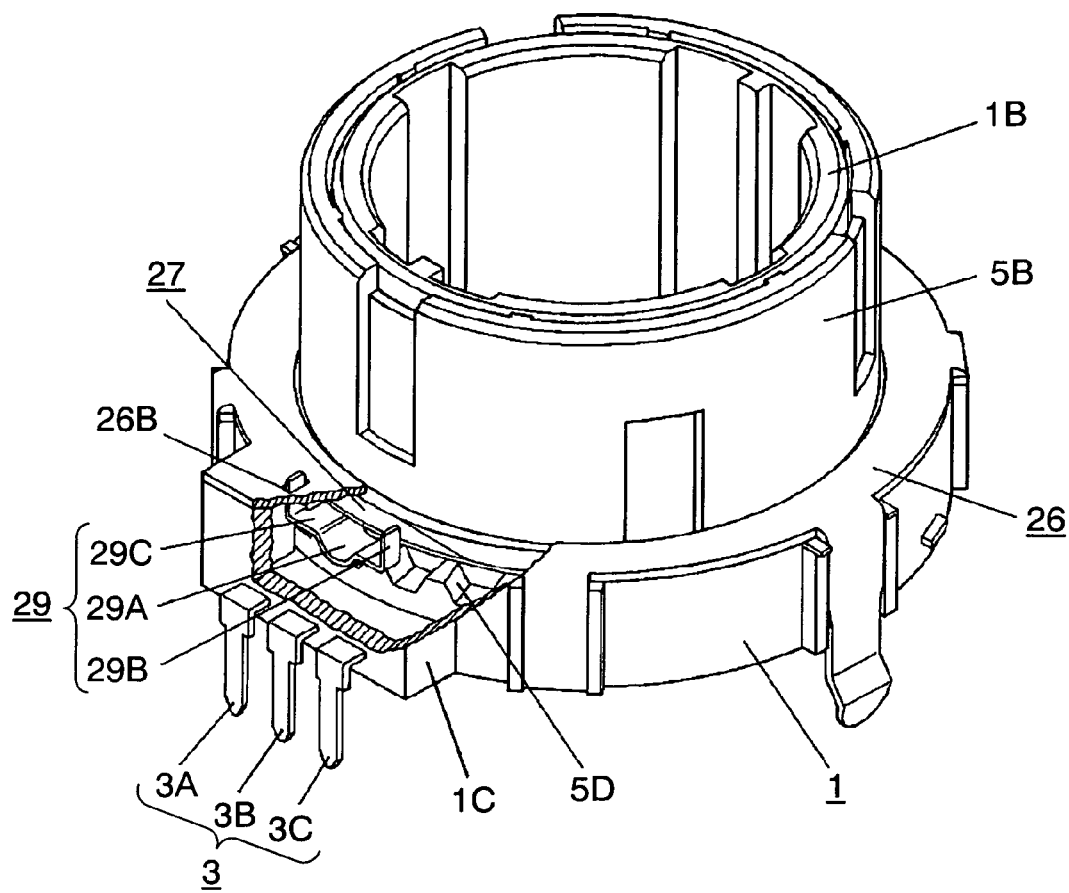
FIG. 10 is a cutaway perspective view of main portions of the rotationally manipulated encoder according to the second embodiment of the invention.
Figure 11:
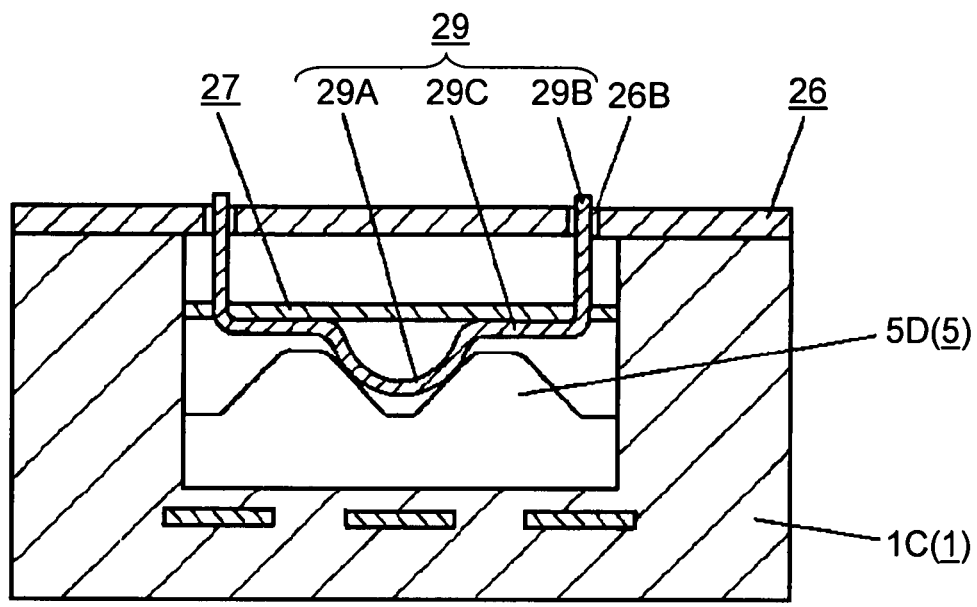
FIG. 11 is a cross-sectional view of main portions of the rotationally manipulated encoder according to the second embodiment of the invention.

As shown in FIGS. 10 and 11, operative element 29 of the rotationally manipulated encoder according to the second embodiment is made of a sheet of a metal. Its shape is a substantially U-shaped form whose opening faces upward as viewed from a side. That is, both ends of flat plate portion 29C are bent upward, forming protrusive portions 29B. Downwardly convex engagement portion 29A is formed in a central portion of flat plate portion 29C.

Annular leaf spring 27 is shaped like a flat plate on the side of terminal leading portion 1C that is on the opposite side of protrusive portion 27A. This portion like a flat plate is in elastic contact with flat plate portion 29C of operative element 29. Downward spring pressure of annular leaf spring 27 brings downwardly convex engagement portion 29A into elastic engagement with uneven portion 5D of flange portion 5C.

Protrusive portions 29B formed at both ends of operative element 29 are vertically movably inserted into two guide holes 26B formed in cover plate 26. Thus, movement of operative element 29 in the direction of rotation and the outward direction going away from the center of rotation is restricted. Furthermore, the operative element 29 is disposed so as to be movable up and down.

The rotationally manipulated encoder according to the second embodiment is constructed as described so far. The operation is next described. The operation for producing an ON/OFF signal from between terminals 3A and 3C and an ON/OFF signal from between terminals 3B and 3C by rotationally manipulating rotary body 5 is the same as in the first embodiment. Also, the operation for obtaining a feeling of clicking when leaf spring 27 makes elastic and sliding contact with uneven portion 5D of rotary body 5 is the same as in the first embodiment. Therefore, their detailed description is omitted.

The operation of operative element 29 performed at this time is described taking an example in which rotary body 5 is rotated from the state in which engagement portion 29A of operative element 29 is in a stable state within a concave portion of uneven portion 5D of rotary body 5. As rotary body 5 rotates, operative element 29 is pushed in the direction of rotation and moves a distance corresponding to the gap between each protrusive portion 29B and guide hole 26B in cover plate 26. At the same time, operative element 29 moves upward in such a way that engagement portion 29A incrementally ascends along the tilted surface of uneven portion 5D against downward spring pressure of leaf spring 27, while protrusive portions 29B at both ends inserted in guide holes 26B in the two locations are being guided. Operative element 29 reaches the top portion of the convex portion of uneven portion 5D. When the position at which the top portion abuts against engagement portion 29a passes beyond the top portion of a convex portion of uneven portion 5D, operative element 29 rushes down the tilted surface going toward the concave portion by the spring pressure of leaf spring 27. At this time, engagement portion 29A, of operating portion 29, collides against the tilted surface going toward the next convex portion of uneven portion 5D, producing a small sound of collision.

The operation of operative element 29 accompanied by rotational manipulation is repeatedly performed. Engagement portion 29A of operative element 29 slides on uneven portion 5D of the top surface of flange portion 5C of rotary body 5. Small sounds of collisions produced successively at this time are heard as clicking sounds of manipulations.

Sounds of collisions can also be produced by setting the dimensions of associated parts such as operative element 29, guide holes 26B, and uneven portion 5D such that protrusive portions 29B of operative element 29 collide against the other side surface of guide holes 26B in cover plate 26.

Operative element 29 is operated in the same way as the foregoing but in the reverse direction if rotary body 5 is rotationally manipulated in the reverse direction. Consequently, sounds of collisions are produced.

In this way, according to the second embodiment, operative element 29 is made movable up and down by inserting protrusive portions 29B at both ends of operative element 29 into guide holes 26B at two locations formed in cover plate 26. Movement of operative element 29 in the direction of rotation and in the outward direction going away from the center of rotation is restricted only by cover plate 26. Consequently, a rotationally manipulated encoder (rotary manipulation type electronic device) which has a simple structure, produces clicking sounds of manipulations, and permits users to easily obtain an audiological sensation of manipulations.

The present invention has been described so far together with the first embodiment and the second embodiment. As is obvious from these descriptions, in a rotary manipulation type electronic device of the present invention, as rotary body 5 is rotationally manipulated, engagement portion 19A (or 29A) of operative element 19 (or 29) engages uneven portion 5D of rotary body 5. Immediately after passing over a convex portion from a concave portion, spring pressure of leaf spring 17 (or 27) or the like causes the operative element to rush down a tilted surface going from the convex portion to the convex portion, and the operative element collides against the base body or the next inclined surface of uneven portion 5D. Thus, the electronic part can be designed to produce clicking sounds of manipulations. A rotary manipulation type electronic device which permits users to obtain an audiological sensation of manipulations can be offered.

Furthermore, with respect to the rotary manipulation type electronic device of the present invention, when rotary body 5 is rotationally manipulated, the electronic part can simultaneously produce a feeling of clicking according to the manipulations.

In addition, in the rotary manipulation type electronic device of the present invention, a feeling of clicking and clicking sound are synchronized. Therefore, a feel of manipulation without feeling of oddness is obtained.

Additionally, in the rotary manipulation type electronic device of the present invention, load at which protrusive portion 17A (or 27A) of leaf spring 17 (or 27) is brought into elastic contact with uneven portion 5D and load at which the operative element is brought into elastic contact are applied to the leaf spring with good balance. Therefore, stable spring load can be maintained for a long time.

Further, in the rotary manipulation type electronic device of the present invention, movement of operative element 19 (or 29) in the direction of rotation and other direction can be restricted only by a cover plate. Consequently, clicking sounds of manipulations can be obtained with a simple structure.

In the first and second embodiments of practice described so far, a rotationally manipulated encoder is described as an example. The present invention can also be applied to a rotary variable resistor, rotary switch, and so on. The operative element may take a shape other than the above-described shape. If the above-described structure in which operative element 19 or operative element 29 is pushed toward uneven portion 5D by leaf spring 17 or leaf spring 27 for obtaining a feeling of clicking is used, the structure can be made up of a small number of components. This gives rise to favorable results. However, the operative element may be pushed similarly with a separate spring body or the like.

As described so far, the rotary manipulation type electronic device according to the present invention permits one to obtain a feel of manipulations when rotational manipulations are performed. The part produces clicking sounds of manipulations, and audiological sensation of manipulations is also obtained. Accordingly, the rotary manipulation type electronic device according to the present invention is useful for adjustments of sound volume, sound quality, image quality, and so on in an AV device and for adjustment of the temperature of an in-vehicle air conditioning system.

What is claimed is:

1. A rotary manipulation electronic device comprising:
   a base body including an opening portion;
   a functional part positioned in the opening portion;
   a rotary body including a rotary bottom surface and an outer periphery having an uneven portion, wherein said rotary body is rotatably supported by said base body;
   a sliding contact positioned on the rotary bottom surface such that said functional part transmits an electrical signal by contacting said sliding contact;
   a cover plate, including a cover plate bottom surface, positioned to cover the opening portion;
   a leaf spring including a leaf protrusion that elastically contacts the uneven portion, wherein said leaf spring is positioned on the cover plate bottom surface; and
   an operative element including a base part and an engagement part that extends away from said base part toward a center of rotation of said rotary body, wherein said engagement part is configured for engaging the uneven portion, wherein said operative element and said leaf spring are separate members and said leaf spring protrusion is positioned opposite from said operative element, and said operative element is mounted relative to said leaf spring such that said leaf spring pushes said operative element towards the uneven portion and such that said operative element is movable relative to said leaf spring in a direction of rotation of said rotary body.

2. The rotary manipulation electronic device of claim 1, wherein the leaf protrusion and the engagement portion are in engagement at positions synchronized with a concave portion or convex portion of the uneven portion.

3. The rotary manipulation electronic device of claim 1,
   wherein the operative element has upwardly protruding protrusive portions; and
   wherein the operative element is disposed such that the protrusive portions are inserted in guide holes formed in the cover plate.

4. The rotary manipulation electronic device of claim 1 wherein said base body is positioned within said rotary body.

5. The rotary manipulation electronic device of claim 1 wherein said leaf spring is annularly shaped.

6. The rotary manipulation electronic device of claim 5 wherein said operative element is mounted relative to said leaf spring such that movement of said operative element relative to said leaf spring in the direction of rotation of said rotary body is restricted movement.

7. The rotary manipulation electronic device of claim 1 wherein said leaf spring further comprises:
   a first leg and a second leg each extending substantially perpendicularly from said leaf spring and each being positioned a first distance from the center of rotation; and
   a third leg positioned a second distance from the center of rotation such that a space is defined between the third leg and the first and second legs.

8. The rotary manipulation electronic device of claim 7 wherein said operative element is positioned in the space and wherein the first, second and third legs are configured to restrict movement of the operative element.

9. The rotary manipulation electronic device of claim 1 wherein said engagement part comprises a cantilever extending from said base part.

10. A rotary manipulation electronic device comprising:
    a base body including an opening portion;
    a functional part positioned in the opening portion;
    a rotary body including a rotary bottom surface and an outer periphery having an uneven portion, wherein said rotary body is rotatably supported by said base body;
    a sliding contact positioned on the rotary bottom surface such that said functional part transmits an electrical signal by contacting said sliding contact;
    a cover plate, including a cover plate bottom surface, positioned to cover the opening portion;
    a leaf spring including a leaf protrusion that elastically contacts the uneven portion, wherein said leaf spring is positioned on the cover plate bottom surface; and
    an operative element including an engagement portion for engaging the uneven portion, wherein said operative element and said leaf spring are separate members and said leaf spring protrusion is positioned opposite from said operative element, and said operative element is mounted relative to said leaf spring such that said leaf spring pushes said operative element towards the uneven portion and such that said operative element is movable relative to said leaf spring in a direction of rotation of said rotary body,
    wherein said operative element has upwardly protruding protrusive portions and is disposed such that the protrusive portions are inserted in guide holes formed in the cover plate.

11. A rotary manipulation electronic device comprising:
    a base body including an opening portion;
    a functional part positioned in the opening portion;
    a rotary body including a rotary bottom surface and an outer periphery having an uneven portion, wherein said rotary body is rotatably supported by said base body;
    a sliding contact positioned on the rotary bottom surface such that said functional part transmits an electrical signal by contacting said sliding contact;
    a cover plate, including a cover plate bottom surface, positioned to cover the opening portion;
    a leaf spring including a leaf protrusion that elastically contacts the uneven portion, a first leg and a second leg each extending substantially perpendicularly from said leaf spring and each being positioned a first distance from the center of rotation, and a third leg positioned a second distance from the center of rotation such that a space is defined between the third leg and the first and second legs, wherein said leaf spring is positioned on the cover plate bottom surface; and
    an operative element including an engagement portion for engaging the uneven portion, wherein said operative element and said leaf spring are separate members and said leaf spring protrusion is positioned opposite from said operative element, and said operative element is mounted relative to said leaf spring such that said leaf spring pushes said operative element towards the uneven portion and such that said operative element is movable relative to said leaf spring in a direction of rotation of said rotary body.

12. The rotary manipulation electronic device of claim 11 wherein said operative element is positioned in the space and wherein the first, second and third legs are configured to restrict movement of said operative element.

* * * * *